(12) United States Patent
Tao et al.

(10) Patent No.: US 8,270,313 B2
(45) Date of Patent: Sep. 18, 2012

(54) RANKING NODES IN NETWORKS WITH TOPOLOGIES ARRANGED AS DIRECTED ACYCLIC GRAPHS

(75) Inventors: Zhifeng Tao, Arlington, MA (US); Di Wang, Troy, NY (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 494 days.

(21) Appl. No.: 12/618,235

(22) Filed: Nov. 13, 2009

(65) Prior Publication Data

US 2011/0116389 A1 May 19, 2011

(51) Int. Cl.
*H04L 12/28* (2006.01)
(52) U.S. Cl. ........................................................ 370/252
(58) Field of Classification Search .................... 370/252
See application file for complete search history.

(56) References Cited

U.S. PATENT DOCUMENTS

| 7,428,221 | B2* | 9/2008 | Thubert et al. | 370/255 |
|---|---|---|---|---|
| 7,649,852 | B2* | 1/2010 | Thubert et al. | 370/254 |
| 7,990,927 | B2* | 8/2011 | Choi et al. | 370/335 |
| 2005/0265259 | A1* | 12/2005 | Thubert et al. | 370/255 |
| 2006/0227724 | A1* | 10/2006 | Thubert et al. | 370/254 |
| 2007/0086358 | A1* | 4/2007 | Thubert et al. | 370/254 |
| 2007/0153707 | A1* | 7/2007 | Thubert et al. | 370/254 |
| 2007/0183346 | A1* | 8/2007 | Thubert et al. | 370/254 |

* cited by examiner

*Primary Examiner* — Jason Mattis
*Assistant Examiner* — Stephen J Clawson
(74) *Attorney, Agent, or Firm* — Dirk Brinkman; Gene Vinokur

(57) ABSTRACT

Embodiments of the invention disclose a system and a method for determining a rank of a node in a multi-hop wireless network, wherein the network includes a gateway node, client nodes, and relay nodes, wherein a node p(i) is a default parent of the node i having a rank, and the network uses a directed acyclic graph (DAG) topology. The method comprises steps of transmitting at least one data packet from the node to the default parent node over a wireless link; counting a number of successful transmissions of most recent transmissions of data packets; determining an expected transmission time (ETX) for the wireless link based on the number of successful transmissions in the most recent transmissions; and assigning a rank R(i) to the node based on the rank of the parent node and the ETX.

20 Claims, 11 Drawing Sheets

100

200

RANKING NODES IN NETWORKS WITH TOPOLOGIES ARRANGED AS DIRECTED ACYCLIC GRAPHS

FIELD OF THE INVENTION

The present invention relates generally to wireless mesh networks, and more particularly to routing data between a gateway and multiple wireless devices in a smart grid network.

BACKGROUND OF THE INVENTION

Wireless Mesh Networks

A wireless mesh network (WMN) is a communication network of nodes, e.g., radio nodes, arranged in a mesh topology. The deployment of WMNs is driven by many applications, including last-mile Internet delivery, distributed sensing, and smart grid network deployment.

FIG. 1 shows an example of the WMN 100, which includes a gateway node 110 and multiple client nodes 120. The gateway node is connected to a backhaul (not shown) using wired or wireless communication links. The gateway node communicates with multiple client nodes wirelessly 125. Data traffic in the WMN includes inward traffic 130 from the client nodes to the gateway node, outward traffic 140 from the gateway node to client nodes, and point-to-point traffic 150 between the client nodes.

Although client nodes in the WMNs are typically stationary, the quality of wireless links between an arbitrary pair of client nodes is in general unstable and varies with time due to fading effects and interference. This instability nature of wireless links requires intelligent routing protocol design for WMNs that can cope with link state changes, deliver data packets with reliability and low latency, and maintain simplicity and flexibility.

DAG Based Routing in WMNs

In wireless networks, a number of routing protocols use directed acyclic graphs (DAG) as an abstraction of the topology of the network in order to keep track of network state information. Example of DAG based routing protocol is IPv6 routing protocol for low power and lossy networks (RPL). RPL is currently under development by the Internet Engineering Task Force (IETF).

FIG. 2 show an example of the DAG 200. The DAG is a directed graph wherein all edges are oriented in such a way that no cycles exist. The RPL is a routing protocol based on the DAG topology. For each DAG created in RPL, there is a root node 210. The DAG root node typically is the gateway node in the WMN. All edges 220 in the DAG are oriented toward and terminating at the root node. Each node in the DAG is associated with a rank 230. The ranks of nodes along any path to the DAG root are monotonically decreasing to avoid cycles.

To construct the DAG, the gateway node issues a control message, i.e., a DAG Information Object (DIO). The DIO conveys information about the DAG. The information includes a DAGID to identify the DAG, rank information for client nodes, and objective function identified by an objective code point (OCP) that specifies the metrics used within the DAG and the method for computing the rank.

Each client node receiving the DIO message for the first time adds a sender of the DIO to a parent list of the client node, determine the client node own rank according to the OCP, and transmits the DIO message with updated rank information. In general, after the client node receives the DIO message, the node has the following options. The node can discard the DIO based on several criteria recommended by the RPL, or process the DIO to maintain a position in an existing DAG or improve position by obtaining a lower rank according to the OCP and current path cost.

After the DAG is constructed, each node is able to forward any inward traffic by selecting a parent as the next-hop node. As shown in FIG. 2, the node 0 has a rank 0, the nodes 1-3 have a rank 1, the nodes 4-7 have a rank 3, and the nodes 8-10 have a rank 4.

To support the outward traffic from the gateway node to a client node, the client node issues a control message called a Destination Advertisement Object (DAO). The information conveyed in the DAO includes the rank of nodes. The rank is used to determine a distance to the client node, and reverse route information recording the nodes along the outward path. After the DAO message is received by the gateway node from the client node, all intermediate nodes in the inward path indicated by the DAG are recorded in the reverse path information of the DAO message, and a complete outward path is determined from the gateway node to the client node.

DAG Based Routing for Smart Grid Networks

A smart grid delivers electricity from electric suppliers to homes using digital technology to control home appliances to save energy, reduce cost and increase reliability. The smart grid integrates information and communications technology with energy technology to permit two way power flow, to achieve seamless operation for electric generation, delivery, and end-use benefit, and to enable wide adoption of renewable energy and electric vehicles.

Currently, most electric suppliers use an Automated Meter Reading (AMR) system to collect data from electric meters. The AMR system is usually radio-frequency based, which provides one-way communications from meters to a data-reading device (via a gateway). The use of AMR saves utility providers the expense of periodic trips to each location to read a meter.

However, the smart grid systems are expected to go one step further and provide more features than AMR. An advanced smart grid system is expected to provide two-way communications that allow utilities to keep track of electricity usage, keep consumers informed of latest electricity prices, and perform remote utility management, all in real-time. One solution for enabling these functionalities is to deploy a multi-hop wireless mesh network that connects all the electric meters (within a certain area) to a gateway, which in turn is connected (possibly by wireline) to a control center that performs the management described above. Such a network is usually called an advanced metering infrastructure (AMI).

It is desired to provide DAG based routing for AMI networks.

SUMMARY OF THE INVENTION

The embodiments of the invention provide a method for DAG based routing protocol that supports operations in an advanced metering infrastructure (AMI) networks. Examples of the operations are:

Inward unicast traffic: every $t_u$ seconds each meter sends measurement of electricity usage to a control center connected via a gateway);

Outward unicast traffic: the control center provides energy usage management control by sending control information to each meter;

Outward broadcast traffic: every $t_b$ seconds the control center broadcasts the latest electricity price to all the meters.

Embodiments of the invention disclose a novel rank-determination method in DAG construction and maintenance, which facilitates providing high end-to-end reliability for the inward unicast traffic. Also, some embodiments use a reverse path recording mechanism to establish the routes for the outward unicast traffic. Furthermore, the embodiments disclose a detailed, efficient DAG maintenance mechanism, which allows the DAG structure to quickly adapt to any link instability, and hence provides reliable paths for both inward and outward traffic.

One embodiment discloses a method for determining a rank of a node in a multi-hop wireless network, wherein the network includes a gateway node, client nodes, and relay nodes, wherein a node p(i) is a default parent of the node i having a rank, and the network uses a directed acyclic graph (DAG) topology. The method comprises steps of transmitting at least one data packet from the node to the default parent node over a wireless link; counting a number of successful transmissions of most recent transmissions of data packets; determining an expected transmission time (ETX) for the wireless link based on the number of successful transmissions in the most recent transmissions; and assigning a rank R(i) to the node based on the rank of the parent node and the ETX.

DETAILED DESCRIPTION OF THE PREFERRED EMBODIMENT

The embodiments of our invention operate in a multi-hop wireless network that includes a gateway node, client nodes, and relay nodes. A node p(i) is a default parent of the node i having a rank R(p(i)). The network topology is arranged according to a directed acyclic graph (DAG).

Embodiments of our invention are based on the realization that the rank of the node i in a multi-hop wireless network can be determined dynamically based on an expected transmission time (ETX) for the link L(i, p(i)), and the rank of the default parent.

Network Information

Figure 1:
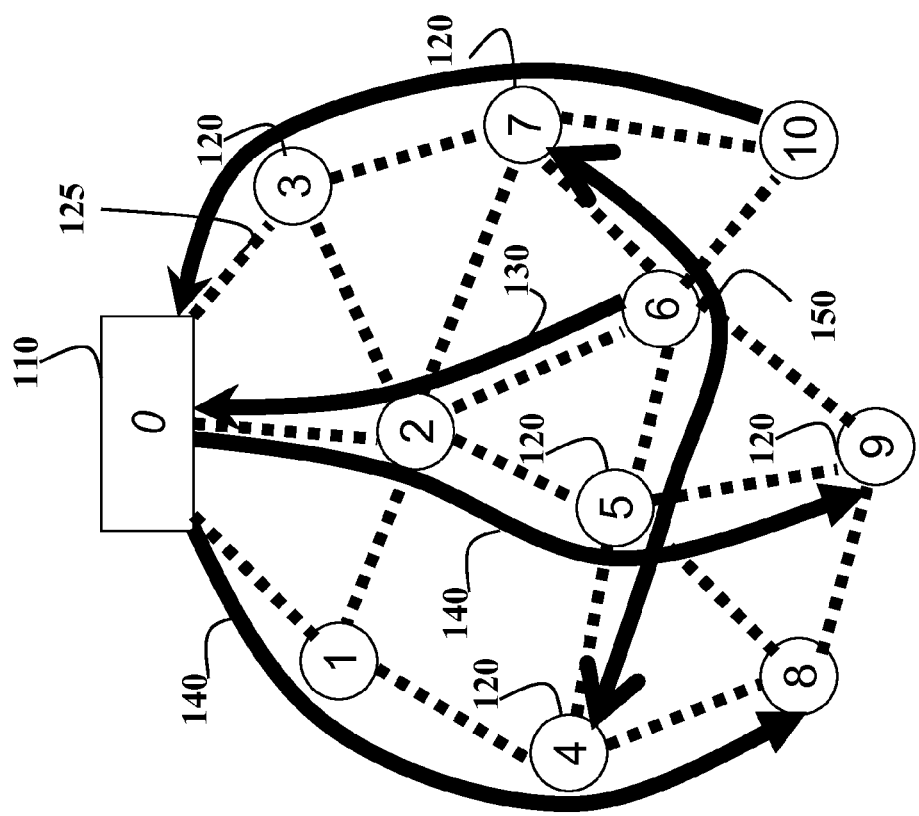
FIG. 1 is an example of a wireless mesh network (WMN)

As shown in FIG. 1, some embodiments of the invention uses an advanced metering infrastructure (AMI) network with one gateway node (0) 110 and n meters 120 (node 1, node 2, . . . , node n). Each node in the network is uniquely identified by a node ID, e.g., an Internet Protocol (IP) address of the node.

The network information stored at each node i (i=1, 2 . . . , n) includes: a rank of the node i; a parent list; a node ID of a default parent; a destination list; and a broadcast sequence number (with initial value of 0).

Each entry of the parent list includes: ID of the parent node; a rank of the parent node; and the expected transmission time (ETX) of the link from node i to the parent node.

Each entry of the destination list includes the ID of a destination node, and an ID of a next-hop node. The default parent of the node i is in the parent list of the node and has a lowest rank among all the nodes in the parent list.

The network information stored by the gateway node 0 includes a rank of the gateway node, e.g., a constant n, a destination list; and a broadcast sequence number (with initial value 1).

Data Packet Forwarding Rules

Inward Unicast Forwarding

A meter node that generates or receives an inward data packet destined for the gateway forwards the packet to the default parent. The packet is discarded if the node does not have the default parent.

Outward Unicast Forwarding

A node that generates or receives an outward data packet destined for a meter node searches for the entry of the destination node in the destination list, and forwards the packet to the next-hop node indicated by that entry. The packet is discarded if the entry is not found.

Outward Broadcast Forwarding

The gateway node that generates the outward broadcast traffic adds the broadcast sequence number to each generated broadcast packet i, and increments the broadcast sequence number by 1 after each broadcast. A meter node that receives the broadcast data packet with sequence number k checks its own broadcast sequence number l. If l<k, the meter node re-broadcast the packet, and change its own broadcast sequence number to k; otherwise, the meter node discards the packet.

Rank Determination

Figure 2:
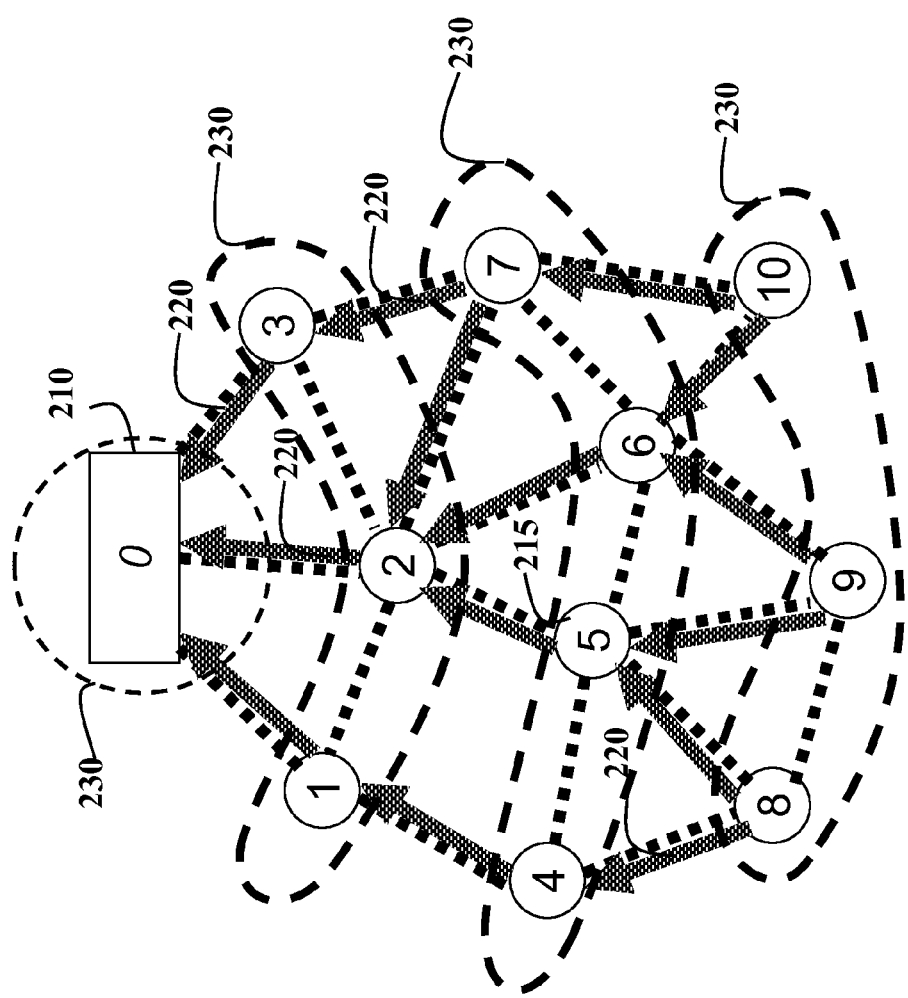
FIG. 2 is a directed acyclic graphs (DAG) structure for the WMN.
Figure 3:
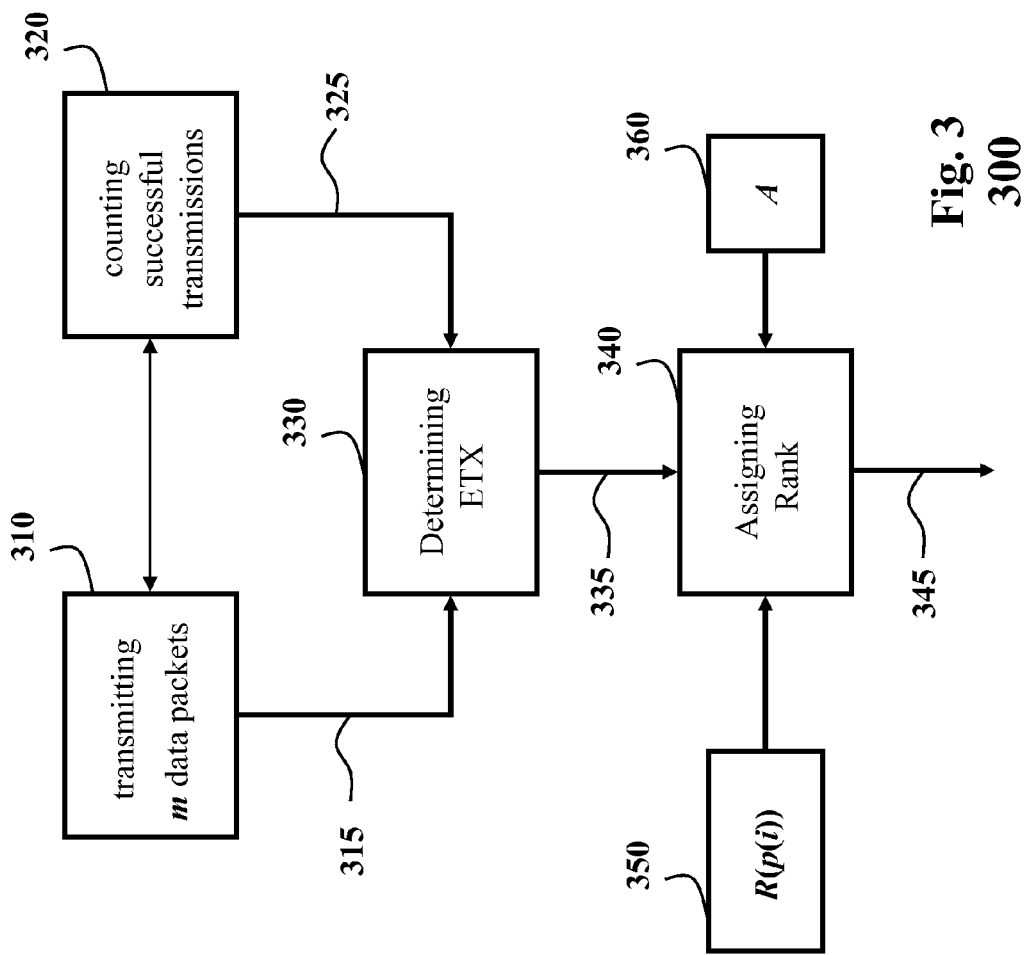
FIG. 3 is a block diagram of a method for determining a rank of a node in a multi-hop wireless network according embodiments of the invention.

FIG. 3 shows a block diagram of a method 300 for determining a rank of a node i in a multi-hop wireless network. The network includes a gateway node, client nodes, and relay nodes, wherein a node p(i) is a default parent of the node i having a rank R(p(i)) 350, and wherein the network uses a directed acyclic graph (DAG) topology. An example network used by the embodiments of the invention is shown in FIG. 2. In one embodiment a rank of the gateway node 210 is set to be a constant value n.

The method 300 assigns 340 a rank R(i) to the node i, i=1, 2 . . . , n. The rank value of other nodes in the DAG, such as client and relay nodes 215, are determined dynamically based on the ETX for the link L(i, p(i)), i.e., the ETX(i, p(i)) 335, and the rank 350 of the default parent according to $$R(i)=R(p(i)) \cdot ETX(i,p(i))+A, \qquad (1)$$

wherein A 360 is a constant. In one embodiment the constant A is 1.

In some embodiments, an initial value of the ETX for any link is 1. After m data packets are transmitted 310 over a link, e.g., the link L(i, p(i)), the ETX value is determined 330. Accordingly, the value of the ETX of each link change over time.

ETX Measurement

The ETX measurement of a link (i, j) is based on a number s of successful network-layer transmissions of the most recent m data packets transmitted from the node i to a node j according to $$ETX(i,j)=m/s. \qquad (2)$$

Accordingly, after transmitting 310 m data packets from the node i to the node p(i) over a link L(i, p(i)), wherein m 315 is a number of most recent transmissions from the node i to the node p(i), a number s 325 of successful transmissions of m data packets is counted 320. The ETX(i, p(i)) 335 for the link L(i, p(i)) is determined 330 and the rank R(i) 345 is assigned 340 to the node i as R(p(i))·ETX(i, p(i))+A.

In one embodiment, the ETX(i, p(i)) is determined after each transmission of the data packet. Alternatively, some embodiments determine the ETX(i, p(i)) after a predetermine number of transmissions.

The information of successful/failed network-layer transmissions can be obtained via a media access control (MAC) layer feedback mechanism. For example, the IEEE 802.11 standard specifies that after successfully receiving a unicast packet at the MAC layer, the receiver will reply with an ACK packet to the sender, and hence, the sender will know the transmission was successful. If the receiver does not receive the ACK and the transmission reaches the maximum retry limit specified by the IEEE 802.11 MAC layer protocol, the MAC layer will report a MAC layer failure to the network layer.

In some implementations of the network, each node i monitors the ETX of links to any of parent nodes of the node i. If node i detects a ETX change in any link to one of the parents, the node i performs a number of construction and maintenance operations in order to maintain a consistent and efficient DAG network.

DAG Construction and Maintenance

To begin DAG construction, the gateway node issues a DAG Information Object (DIO) message. Any node that receives the DIO message processes the message and either discards the DIO or modifies and forwards the DIO. Accordingly, the DIO messages are propagating over the entire AMI network such that each node is able to maintain the required network information to support all the three types of aforementioned data traffic.

Figure 4:
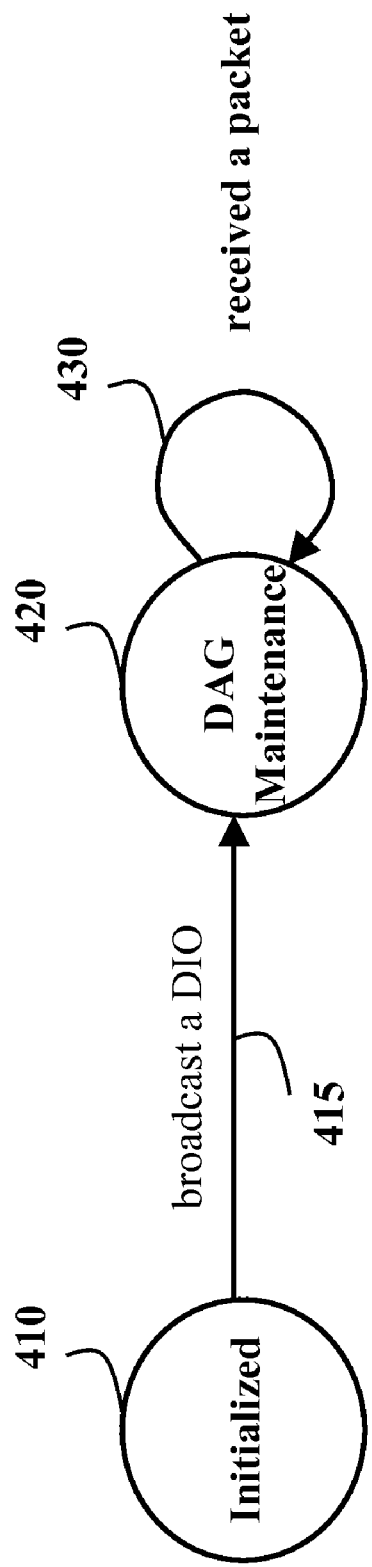
FIG. 4 is a state transition diagram for a gateway node.

FIG. 4 shows a state transition diagram for the gateway node during the DAG construction and maintenance. The gateway node is in an initialized state 410 after the node is powered on and ready to perform any operations designated by a routing protocol. The gateway node in the initialized state broadcast 415 the DIO message using the User Data Protocol (UDP). The DIO message includes information such as DAGID (=0); and the rank value (n).

Then, the gateway node enters a DAG-maintenance state 420, in which the node performs a sequence of operations upon receiving 430 data packets.

Figure 5:
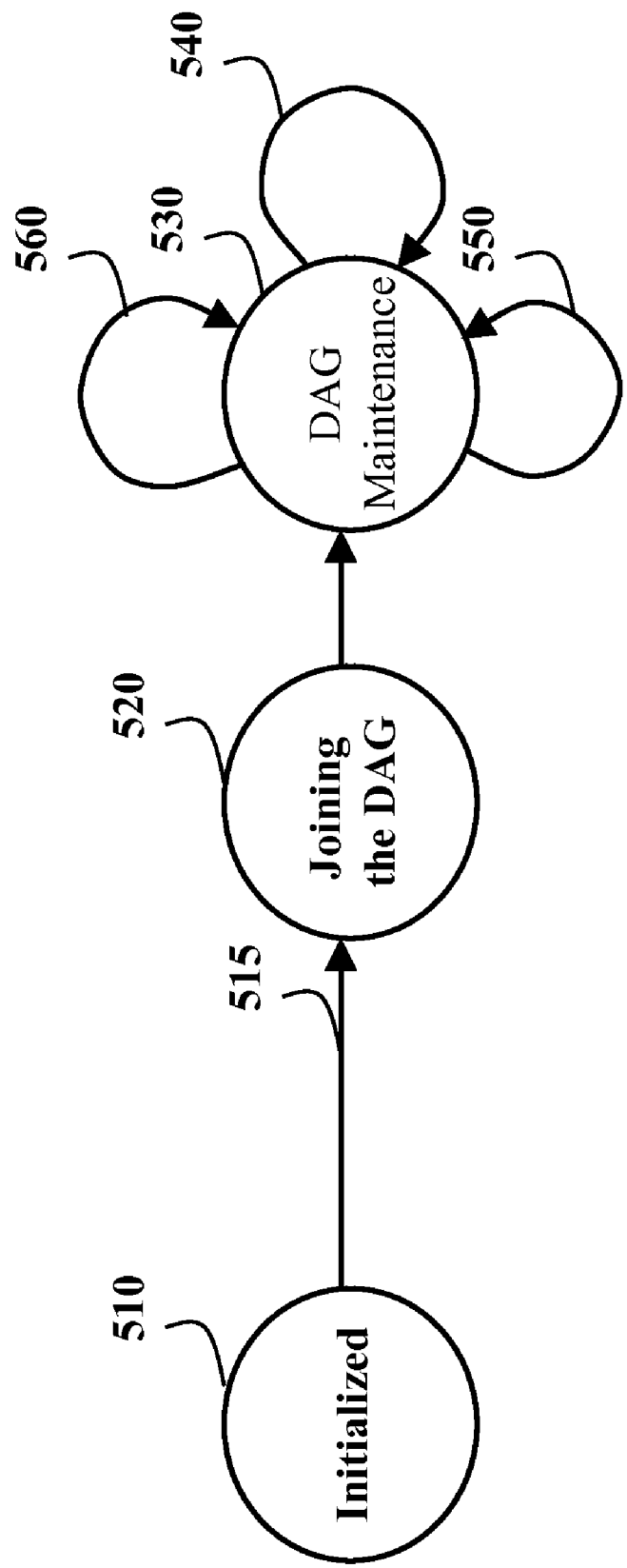
FIG. 5 is a state transition diagram for a meter node.

FIG. 5 shows a state transition diagram for a node i (i=1, 2, . . . , n) during the DAG construction and maintenance. A node is in an initialized state 510 after the node is powered on and is ready to perform any operations designated by the routing protocol. The node in the 'Initialized' state receiving the DIO transitions 515 to a temporary state "Joining-the-DAG" 520 in which the node performs a sequence of operations and then is transitioned to the DAG-maintenance state 530. A node the DAG-maintenance state can perform various operations, depending on the triggering events including receiving the DIO 560; receiving the data packet 540, and detecting an ETX change 550.

Gateway Node in the 'DAG-Maintenance' State

Figure 6:
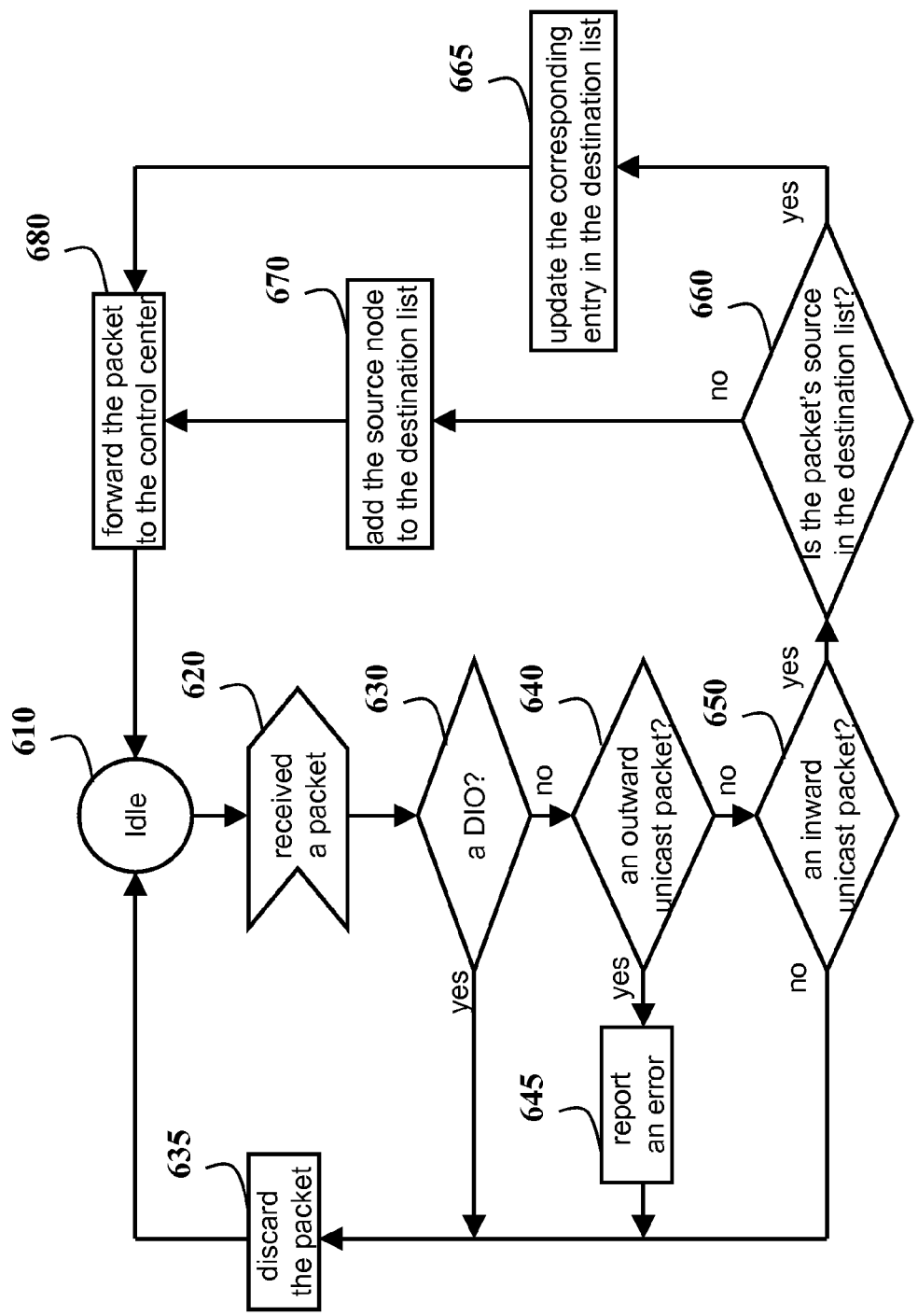
FIG. 6 is a flow chart of operations performed by the gateway node in a DAG-Maintenance state.

FIG. 6 shows operations performed by the gateway node in the DAG-Maintenance state. The operation performed by the gateway node depends on a type of received packet 620. If the packet is the DIO 630 then the packet discarded 635. If the packet is an outward data packet, then the packet is discarded due to a routing loop, and an error is reported 645.

If the packet is an inward data packet 650, then the gateway node starts the reverse path recording mechanism. The gateway node checks if the source of the packet is in the destination list 660 of the gateway node. If no, then a new entry for the destination list is created 665, with the destination node ID being the packet's source IP address, and the next-hop node ID being the packet's last-hop node ID. Otherwise, a corresponding entry is updated 670 accordingly and the inward data packet is forwarded 680 to a control center.

Meter Nodes in the 'Joining-the-DAG' State

Figure 7:
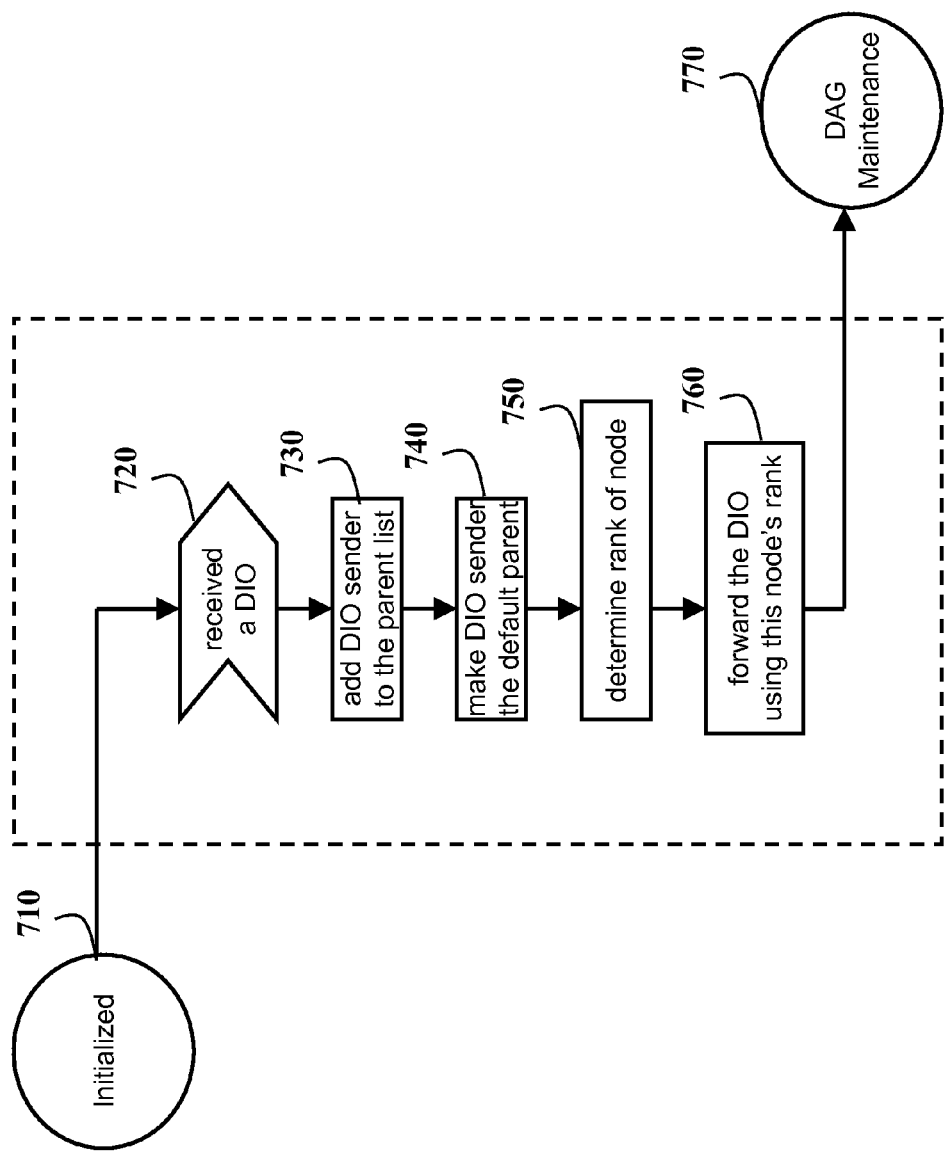
FIG. 7 is a flow chart of operations performed by a meter node in a Joining-the-DAG state.

FIG. 7 shows the operations performed by a meter node in the temporary Joining-the-DAG state. After receiving 720 the DIO message the node adds 730 the DIO sender to the parent list by recording the node ID and the rank in a new entry in the parent list, and makes 740 the sender node the default parent node. The node then determines 750 the rank according Equation (1), forwards 760 the DIO message with the rank information updated with the rank, and enters 770 the 'DAG-Maintenance' state.

Meter Nodes in the 'DAG-Maintenance' State

Figure 8:
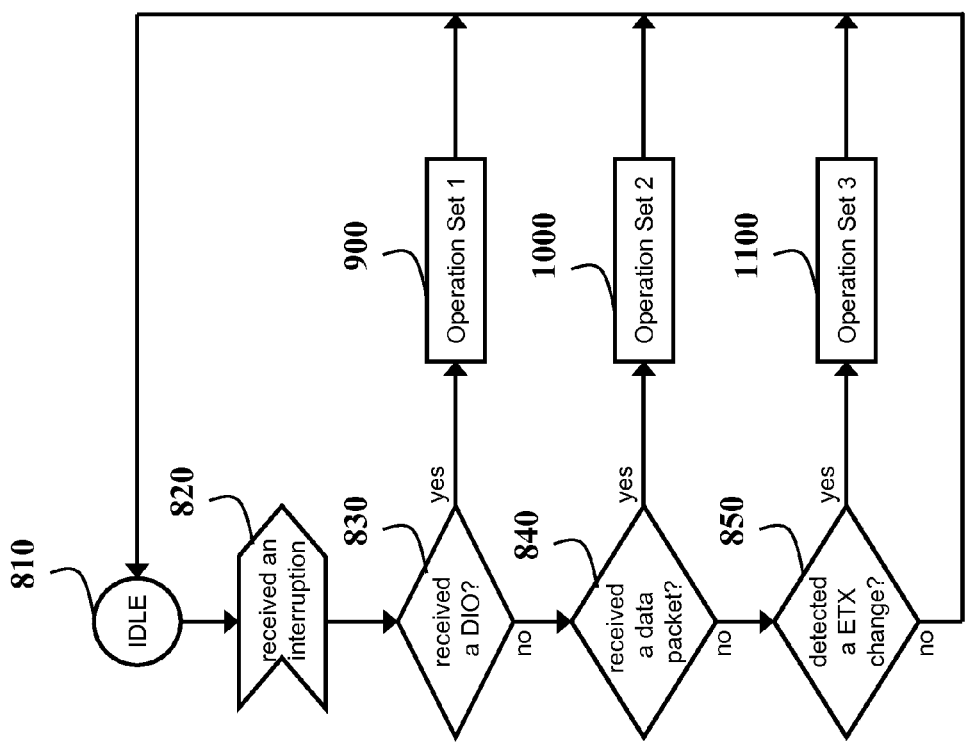
FIG. 8 is a flow chart of operations performed by a meter node in a DAG-Maintenance state.

FIG. 8 shows the operations performed by the meter node (e.g., node i) in the 'DAG-Maintenance' state. The meter node i in the IDLE sub-state 810 may receive 820 three types of interruptions by receiving 830 the DIO, receiving 840 the data packet, and detecting 850 the ETX change.

Figure 9:
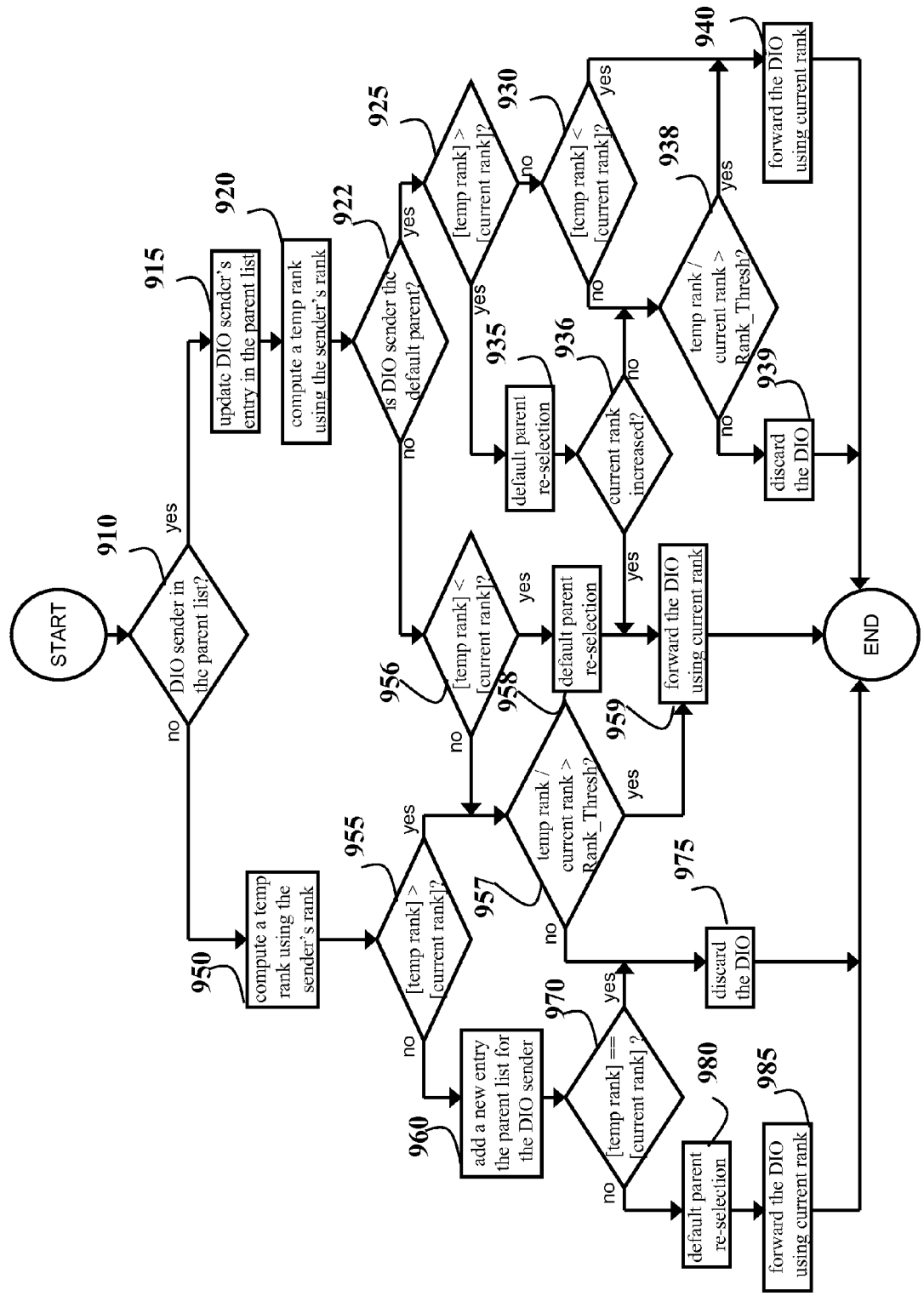
FIG. 9 is a flow chart for Operation Set 1 defined in FIG. 8.
Figure 10:
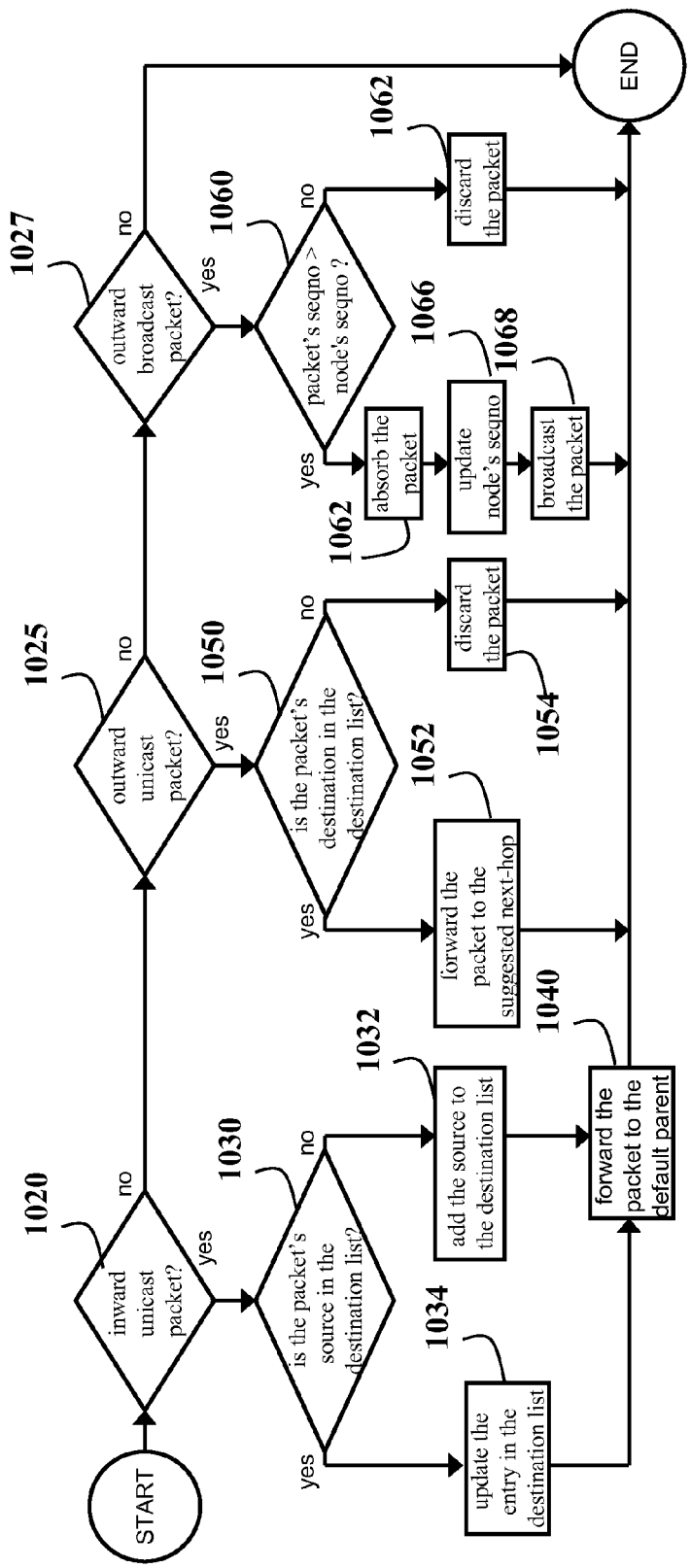
FIG. 10 is a flow chart for Operation Set 2 defined in FIG. 8.
Figure 11:
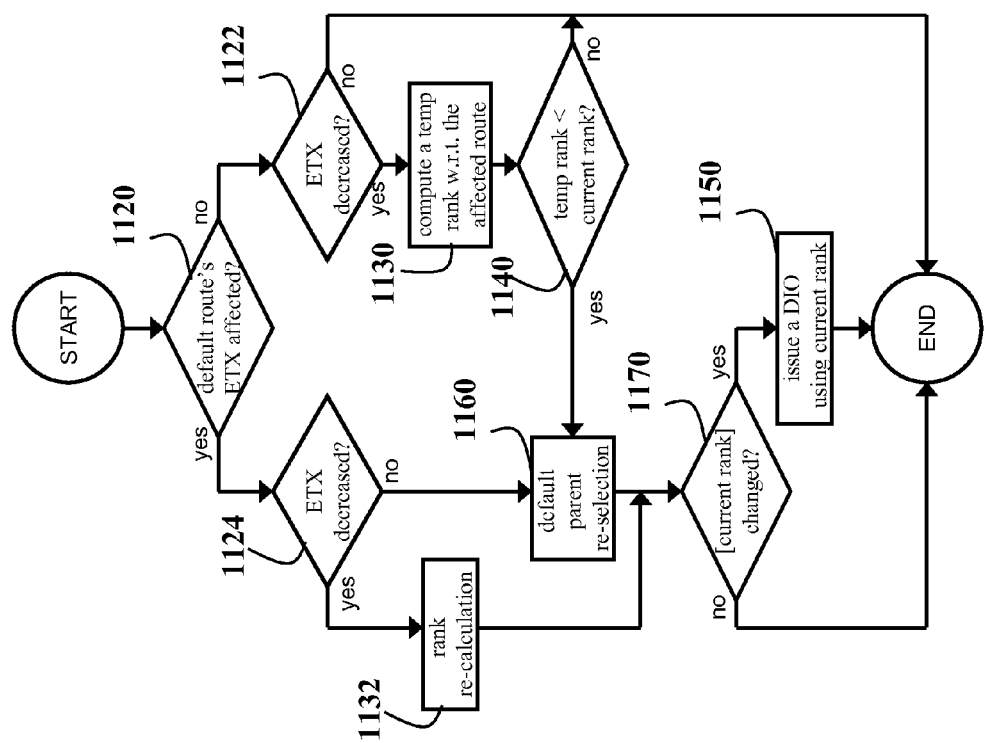
FIG. 11 is a flow chart for Operation Set 3 defined in FIG. 8.

Depending on the type of interruption, the node performs different sets of operations shown in FIG. 9-11, respectively.

FIG. 9 shows the operations performed by node i after the node receives a DIO message from another node j. The node i checks 910 if the DIO sender j is in the parent list. If node j is not in the node i's parent list, then node i compute 950 a temporary rank T according to Equation (1) using the sender j's rank, and then compares 955 the temporary rank to a current rank C of the node.

If [T]≦[C], wherein [x] denote the nearest integer value to x, then node i adds 960 a new entry to the parent list, in which the parent node is the node j, and the rank value is node j's rank indicated by the DIO. If [T]=[C] 970, then node i discards 975 the DIO message and transitions to the IDLE state 810. Otherwise, the node i re-selects 980 default parent, re-determines the rank according to Equation (1), and forwards the DIO, e.g., broadcasting using the current rank value, and returns to the IDLE state.

If [T]>[C], then the node i checks 957 if the ratio T/C has exceeded a predefined threshold value $R_T$. If T/C>$R_T$, then the node i forwards 959 the DIO using the current rank for the purpose of improving the rank of the node i; otherwise node i discards 975 the DIO message.

If the node j is in the parent list of the node i, then the node i updates 915 the node j's entry using the information provided by the DIO. Then the node i computes 920 a temporary rank T according to Equation (1) using the sender j's rank, and compares the temporary rank T with the current rank C.

If node j is not node i's default parent and [T]≧[C], then the node i computes 957 the ratio T/C. If T/C>$R_T$, and the node i forwards the DIO using the current rank for the purpose of improving node i's rank. Otherwise, node i discard 975 the DIO message.

If node j is not node i's default parent and [1]<[C] 956, then node i re-selects 958 the default parent, re-compute the rank value according to Equation (1), and forwards 959 the DIO, e.g., by broadcasting using the current rank value, and returns to the IDLE state.

If node j is node i's default parent and [T]>[C] 925, then node i re-selects 935 the default parent and re-computes the rank according to Equation (1). If the value of [C] has increased 936 after the default parent re-selection, node i forward 959 the DIO using the current rank. If [C] is not increased, then node i compute the ratio T/C 938. If T/C>$R_T$, node i forwards 940 the DIO using the current rank for the purpose of improving the rank of the node i. Otherwise, node i discards 939 the DIO message.

If node j is the node i's default parent and [1]<[C], then node i determines the ratio T/C. If T/C>$R_T$, the node i forwards 940 the DIO using its current rank for the purpose of improving the rank of the node i. Otherwise, node i discards 939 the DIO message.

FIG. 10 shows the operations performed by node i after receiving the data packet. If the node i receives 1020 an inward unicast packet sourced from another node j, the node i starts the reverse path recording mechanism. The node i checks 1030 if there is an entry for the node j in the destination list of the node i. If not, then a new entry is created 1032, with the destination node ID being node j's IP address, and the next-hop node ID being the packet's last-hop node ID. If the entry for node j exists, the entry is updated 1034 accordingly, and the data packet is forwarded 1040 to the node default parent of the node i.

If the node i receives 1025 an outward unicast packet destined to another node j, the node i checks 1050 if there is an entry for node j in the destination list. If there is, node i forwards 1052 the packet to the next-hop node indicated in the entry, otherwise, the packet is discarded 1054.

If the node i receives 1027 an outward broadcast packet, the node i checks 1060 if a broadcast sequence number of the packet is greater than the broadcast sequence number of the node i. If yes, the node i absorbs 1062 the packet, updates 1066 the sequence number to be the sequence number of the packet, and broadcasts 1068 the packet. Otherwise, the packet is discarded 1062.

FIG. 11 shows the operations performed by node i after detecting a ETX change in the link to the parent node j. If the node j is the default parent of the node i and the ETX has decreased 1124, then node i re-calculates 1132 the rank C according to Equation (1). If the value of [C] has changed 1170 after the re-calculation, then node i issues 1150 a DIO message using the updated rank.

If the node j is the default parent of the node i and the ETX has increased, then node i re-selects 1160 the default parent and re-calculates the rank C according to Equation (1). If the value of [C] has changed 1170 after the re-calculation, then node i issues 1150 a DIO message using the updated rank;

If the node j is not the default parent of the node i and the ETX has decreased 1122, then the node i computes 1130 a temporary rank T using the rank of the node j. If T<C 1140, then the node i selects 1160 the
node j as the default parent and update the rank C. If the value of [C] has changed 1170 after the re-selection, then node i issues 1150 a DIO message using the updated rank.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a rank of a node i in a multi-hop wireless network, wherein the network includes a gateway node, client nodes, and relay nodes, wherein a node p(i) is a default parent of the node i having a rank R(p(i)), and wherein the network uses a directed acyclic graph (DAG) topology, comprising steps of:
   transmitting at least one data packet from the node i to the node p(i) over a wireless link;
   counting a number of successful transmissions of most recent transmissions of data packets;
   determining an expected transmission time (ETX) for the wireless link based on the number of successful transmissions in the most recent transmissions; and
   assigning a rank R(i) to the node i as R(p(i))·ETX(i, p(i))+A, wherein ETX(i, p(i)) is the ETX of the wireless link, and A is a constant, wherein the transmitting is to the default parent p(i) of the node (i) and the counting, determining, and assigning steps are performed by a gateway node in the multi-hop wireless network and the rank avoids cycles in the DAG representing the network.

2. The method of claim 1, further comprising:
   acquiring the rank of the default parent of the node i.

3. The method of claim 1, further comprising:
   assigning an initial value of 1 to the ETX(i, p(i)).

4. The method of claim 1, further comprising:
   repeating, in response to the transmitting, the counting and the determining to update the ETX(i, p(i)).

5. A method for determining a rank of a node i in a multi-hop wireless network, wherein the network includes a gateway node, client nodes, and relay nodes, wherein a node p(i) is a default parent of the node i having a rank R(p(i)), and wherein a topology of the network is according to a directed acyclic graph (DAG), comprising steps of:
   transmitting at least one data packet from the node i to the node p(i) over a link L(i, p(i));
   counting a number s of successful transmissions of m data packets, wherein m is a number of most recent transmissions from the node i to the node p(i);
   determining an expected transmission time (ETX) for the link L(i, p(i) according to ETX(i, p(i))=m/s; and
   assigning a rank R(i) to the node i as R(p(i))·ETX(i, p(i))+A, wherein
   A is a constant, wherein the transmitting is to the default parent p(i) of the node (i) and the counting, determining, and assigning steps are performed by the gateway node in the multi-hop wireless network and the rank avoids cycles in the DAG representing the network.

6. The method of claim 5, further comprising:
   assigning a rank to the gateway node, wherein the rank assigned to the gateway node is a constant.

7. The method of claim 5, wherein the constant A is 1.

8. The method of claim 5, further comprising:
   assigning an initial value of 1 to the ETX(i, p(i)).

9. The method of claim 5, further comprising:
   repeating, in response to the transmitting, the counting and the determining to update the ETX(i, p(i)).

10. The method of claim 5, further comprising:
    determining the number s via a media access control (MAC) layer feedback mechanism.

11. The method of claim 5, further comprising:
    acquiring a parent list of the node i, wherein the parent list includes a node k;
    acquiring a rank R(k) of the node k; and
    acquiring an ETX(i, k) of a link from the node i to the node k.

12. The method of claim 11, wherein the node k advertises the rank R(k).

13. The method of claim 11, further comprising:
    acquiring the rank R(p(i)) of the default parent of the node 1.

14. The method of claim 11, further comprising:
selecting the default parent based on the ETX of each link between the node i and each node in the parent list, and the rank of each node in the parent list.

15. The method of claim 11, further comprising:
determining, for each node in the parent list, a temporary rank; and
transmitting a message indicative of the updated rank R(i), if a ratio between the temporary rank and the rank R(i) is greater than a threshold.

16. The method of claim 5, further comprising:
acquiring the rank R(p(i)) of the default parent of the node i;
determining the ETX(i, p(i)); and
updating the rank R(i) in response to changes in values of the ETX(i, p(i)) and/or the rank R(p(i)).

17. The method of claim 16, further comprising:
transmitting a message indicative of the updated rank R(i).

18. The method of claim 5, wherein the network is an advanced metering infrastructure.

19. The method of claim 5, wherein the network is an advanced metering infrastructure (AMI) network, and the node i is a meter node.

20. A system for determining a rank of a node i in a multi-hop wireless network, wherein the network includes a gateway node, client nodes, and relay nodes, wherein a node p(i) is a default parent of the node i having a rank R(p(i)), and wherein a topology of the network is according to a directed acyclic graph (DAG), comprising
means for transmitting at least one data packet from the node i to the node p(i) over a link L(i, p(i));
means for counting a number s of successful transmissions of m data packets, wherein m is a number of most recent transmissions from the node i to the node p(i);
means for determining an expected transmission time (ETX) for the link L(i, p(i)) according to ETX(i, p(i)) =m/s; and
means for assigning a rank R(i) to the node/as R(p(i))·ETX (i, p(i))+A, wherein A is a constant.

\* \* \* \* \*